Figure 8:
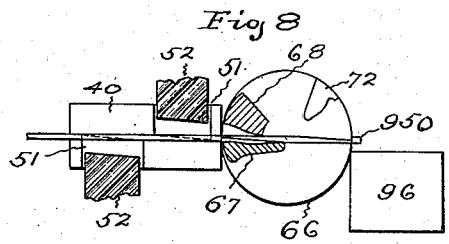

J. MERRITT & W. A. SAWYER.
STAPLE FORMING MACHINE.
APPLICATION FILED MAY 15, 1912. RENEWED JULY 1, 1915.
1,165,994.
Patented Dec. 28, 1915.
6 SHEETS—SHEET 1.
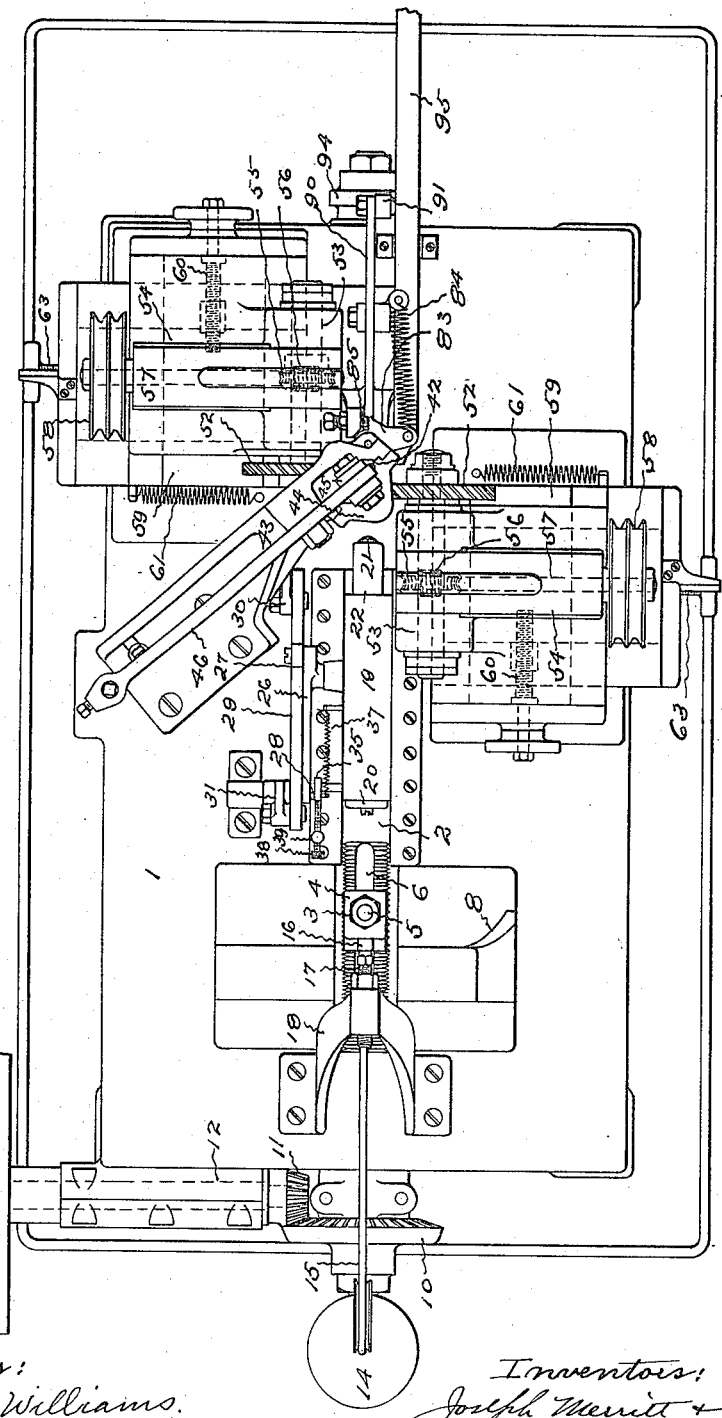

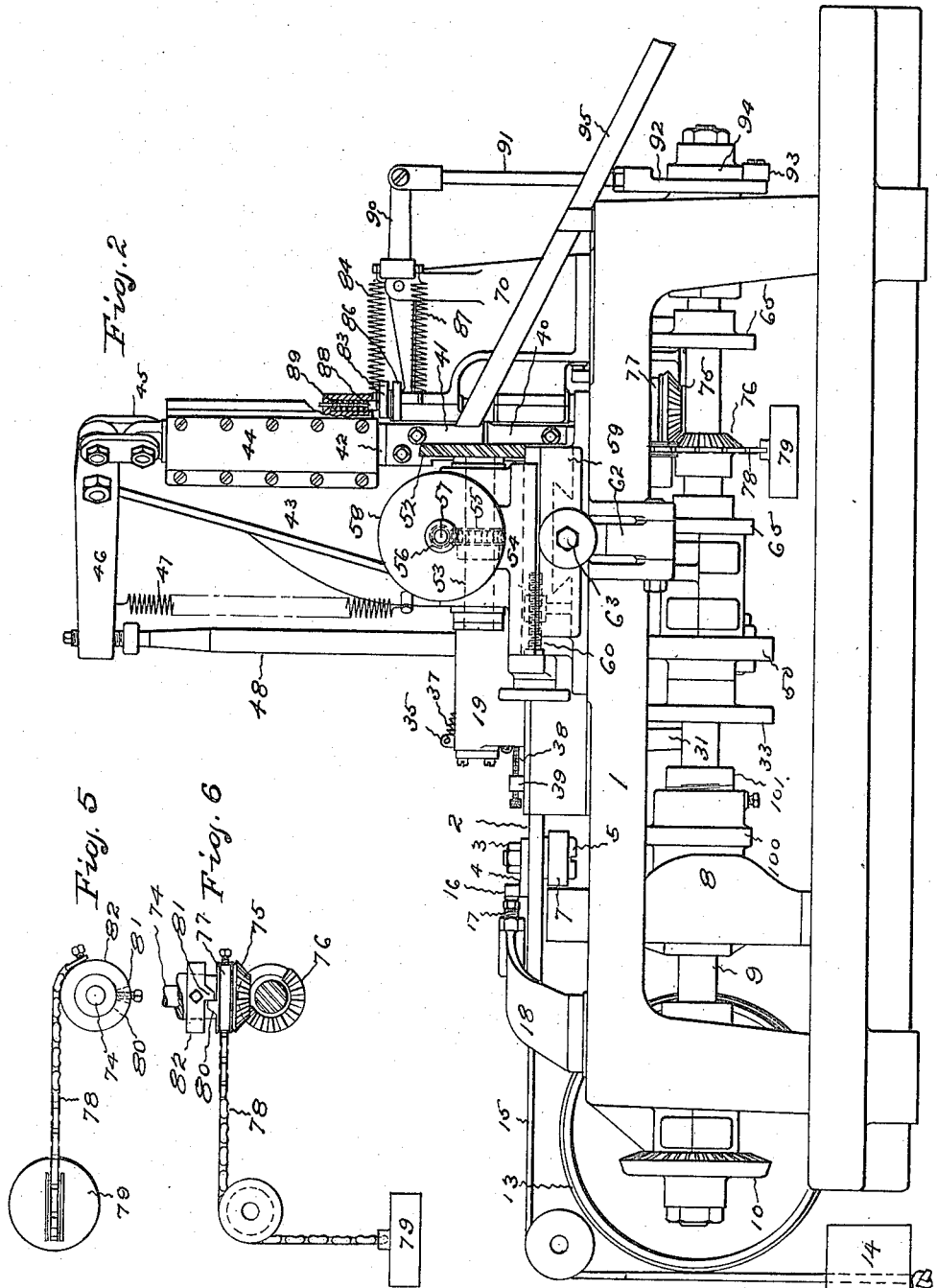

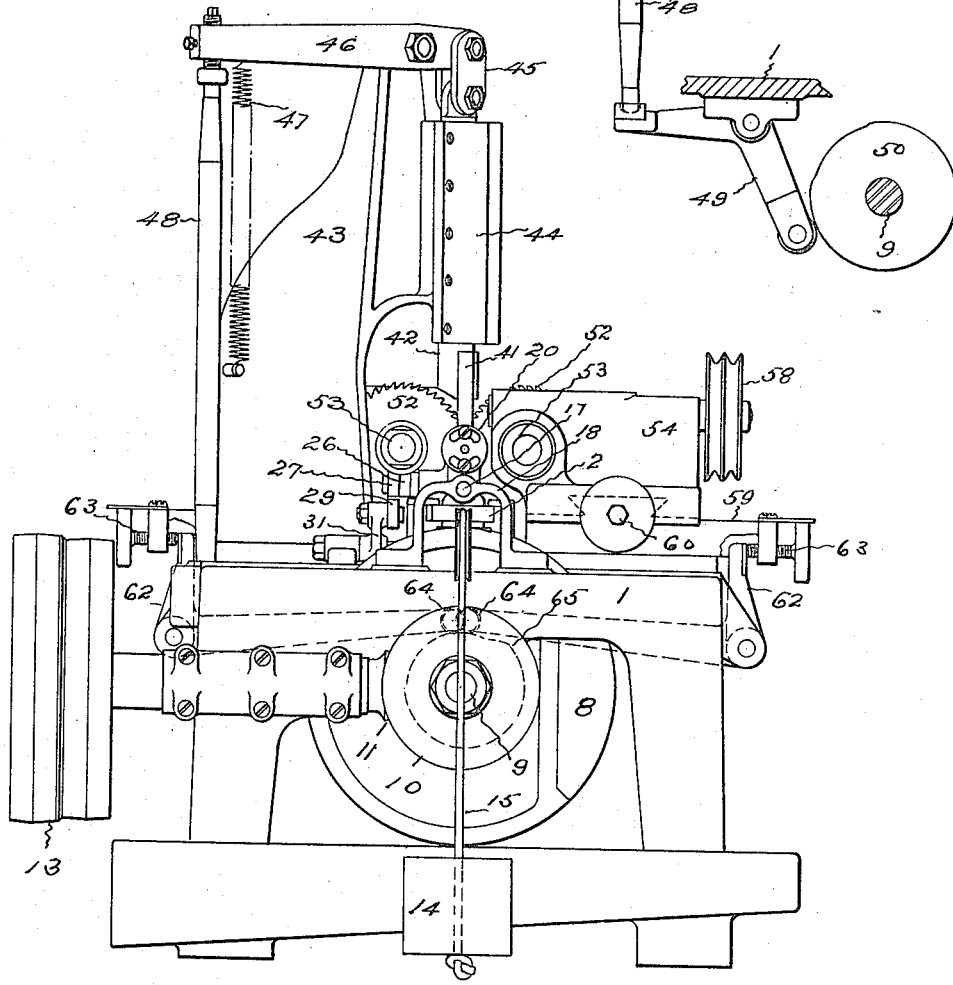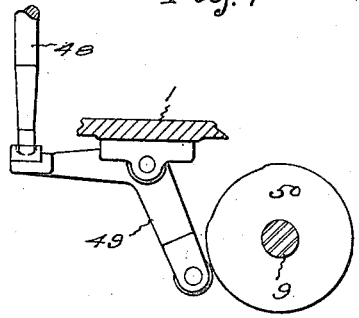

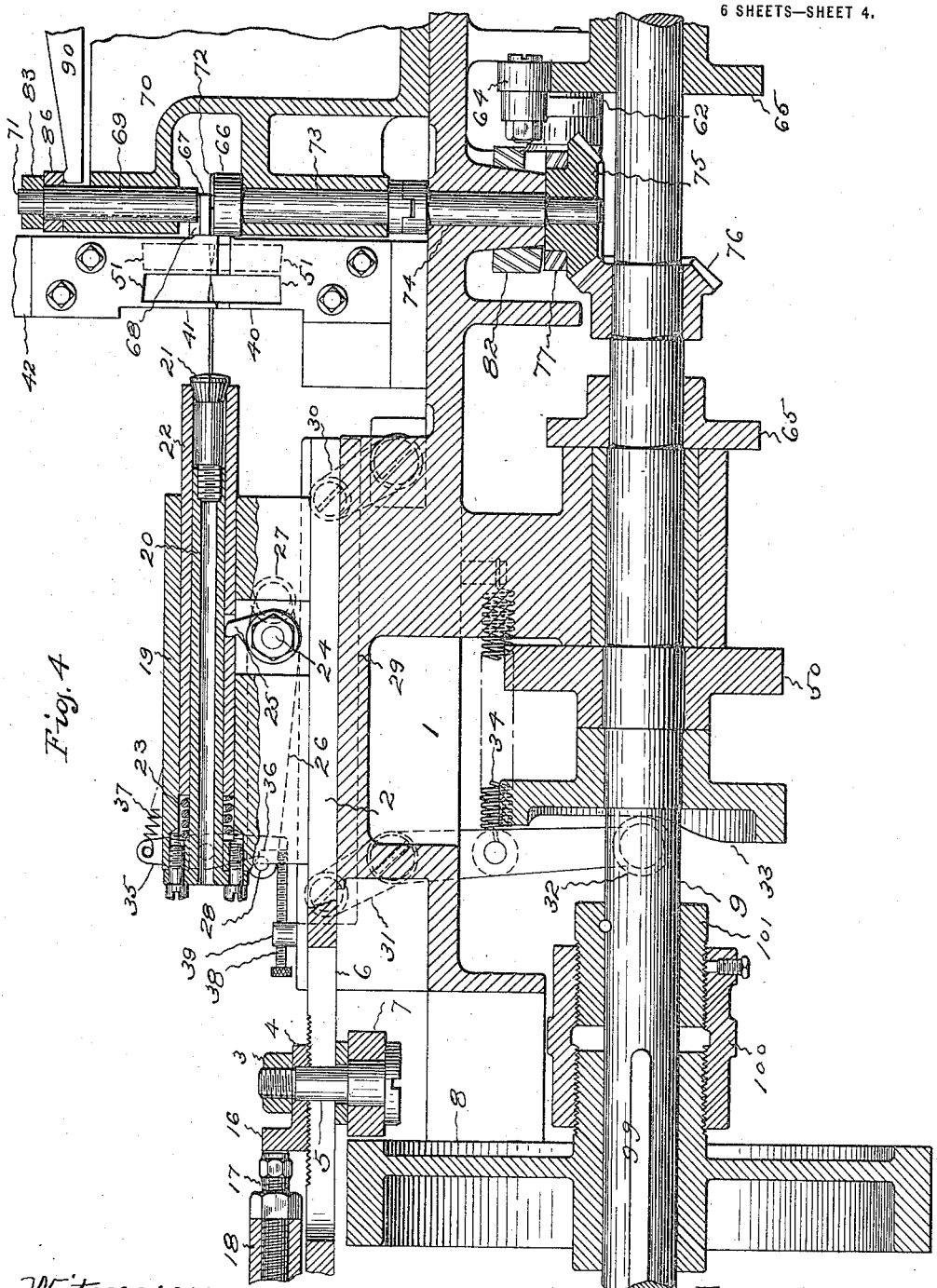

J. MERRITT & W. A. SAWYER.
STAPLE FORMING MACHINE.
APPLICATION FILED MAY 15, 1912. RENEWED JULY 1, 1915.

1,165,994.

Patented Dec. 28, 1915.
6 SHEETS—SHEET 5.

Witnesses:
Elizabeth Williams.
Josephine M. Strempfer.

Inventors:
Joseph Merritt &
William A. Sawyer
by Harry R. Williams
atty.

COLUMBIA PLANOGRAPH CO., WASHINGTON, D. C.

J. MERRITT & W. A. SAWYER.
STAPLE FORMING MACHINE.
APPLICATION FILED MAY 15, 1912. RENEWED JULY 1, 1915.

1,165,994.

Patented Dec. 28, 1915.
6 SHEETS—SHEET 6.

Witnesses:
Elizabeth Williams.
Josephine M. Strempfer.

Inventors:
Joseph Merritt &
William A. Sawyer
Nany R. Williams atty.

UNITED STATES PATENT OFFICE.

JOSEPH MERRITT, OF HARTFORD, AND WILLIAM A. SAWYER, OF WEST HARTFORD, CONNECTICUT, ASSIGNORS, BY DIRECT AND MESNE ASSIGNMENTS, TO THE HARTFORD LOCK RING COMPANY, OF HARTFORD, CONNECTICUT, A CORPORATION OF CONNECTICUT.

STAPLE-FORMING MACHINE.

1,165,994.      Specification of Letters Patent.      Patented Dec. 28, 1915.

Application filed May 15, 1912, Serial No. 697,432. Renewed July 1, 1915. Serial No. 37,591.

*To all whom it may concern:*

Be it known that we, JOSEPH MERRITT and WILLIAM A. SAWYER, citizens of the United States, residing at Hartford and West Hartford, respectively, in the county of Hartford and State of Connecticut, have invented a new and useful Improvement in Staple-Forming Machines, of which the following is a specification.

This invention relates to a machine for forming staples from a coil of wire.

The machine shown is especially designed for forming staples from very fine wire, although of course the machine could be designed of such size and strength as to form staples of large wire. The small staples made on this machine are intended to be driven into curved tubes, which curved tubes after the staples have been inserted are to have their ends brought together so as to form rings with the staples reinforcing the joints and strengthening the rings.

The object of the invention is to provide a machine which will rapidly and accurately form the wire into staples of the required size and shape, and with ends suitably pointed to effect the desired result when they are driven into the ring-tubes.

The machine illustrated is constructed to intermittently feed a length of wire to jaws which grip the length of wire fed and hold it firmly while milling cutters move up and cut away the wire on a taper near each end of the length that has been fed. After the mills have operated, the stock is released and the next feed carries the milled portion of the stock to mechanism which holds one end while the other end is trimmed and bent around to form the staple, and then after the staple is separated from the stock the bending parts move out of the way so as to release the finished staple and allow it to be ejected from the machine.

Figure 9:
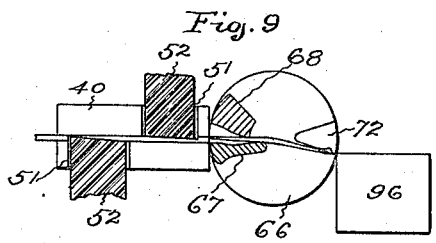
Figure 10:
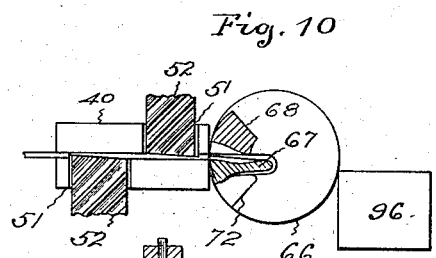
Figure 11:
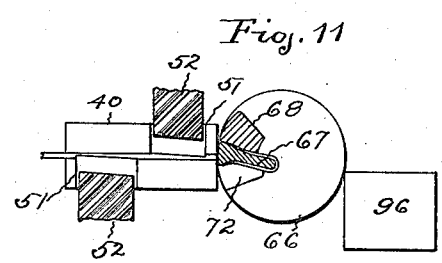
Figure 12:
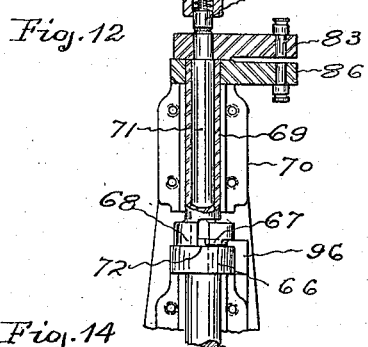
Figure 13:
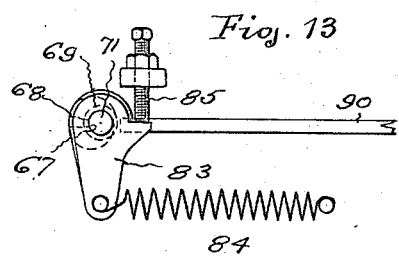
Figure 14:
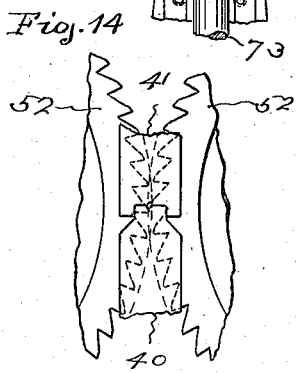
Figure 16:
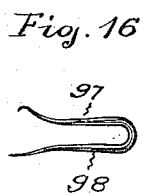
Figure 15:
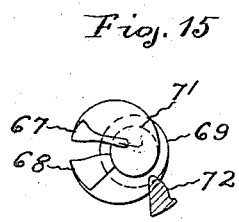
Figure 17:
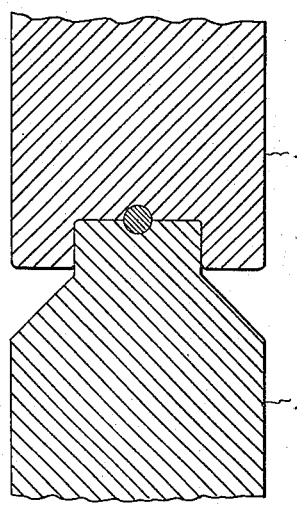
Figure 18:
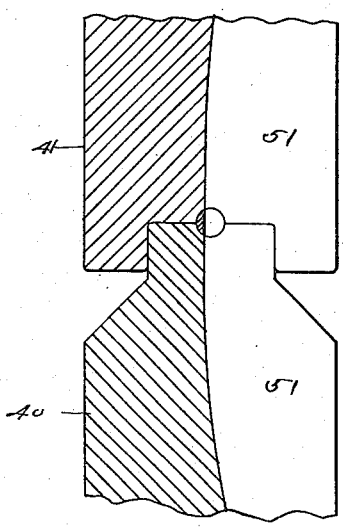
Figure 19:
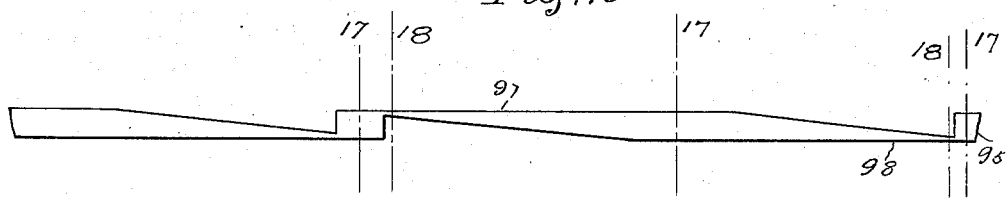
Figure 20:
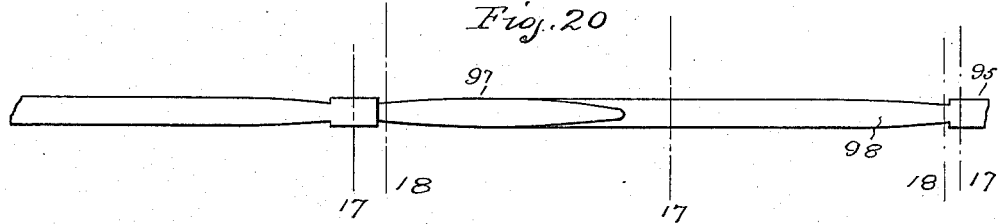

Figure 1 of the accompanying drawings shows a plan of the machine. Fig. 2 shows a front elevation. Fig. 3 shows an end elevation. Fig. 4 shows on larger scale a vertical longitudinal section of the operating mechanism. Fig. 5 is a plan, and Fig. 6 is a side view of the drive and return mechanism for the wire bender. Fig. 7 is a view of the cam and lever that are employed for lifting the movable gripping jaw. Fig. 8 is a plan of the stationary gripping jaw and the bending parts, in the positions occupied just after the section of wire to be bent is fed. Fig. 9 is a view of the same with the parts in the positions occupied when the forward tip is cut off and the bending of the wire has commenced. Fig. 10 is a similar view showing the bending of one side of the staple completed. Fig. 11 is a view of the same parts showing the staple completely formed and cut off from the rest of the stock. Fig. 12 shows an elevation of the bending mechanism. Fig. 13 shows a plan of the means employed for holding the staple forming mandrel in position. Fig. 14 shows an edge view of the gripping jaws and sections of the mills. Fig. 15 is a view looking up at the mandrel and former. Fig. 16 is a view on greatly enlarged scale of a staple that is produced by this machine. Fig. 17 is a vertical section of the jaws and stock, on greatly enlarged scale, taken through the plane indicated by any one of the three dotted lines 17—17 on Figs. 19 and 20. Fig. 18 is a similar view showing the sectional form on either of planes indicated by the dotted lines 18—18 on Figs. 19 and 20. Fig. 19 shows a plan and Fig. 20 shows a side view, on greatly enlarged scale of a strip of milled stock from which the staples are bent.

Movable back and forth longitudinally on the bed 1 is the feed slide 2. Adjustably fastened to this slide by the nut 3 and plate 4 is a stud 5 which extends through a slot 6 and below the slide carries a roll that is engaged by the cam 8 for moving the slide forward and feeding the wire. (Fig. 4). When the nut and plate are loosened, the slide can be adjusted one way or the other for changing its path of movement. The cam is held on the cam shaft 9 by a feather 99 and a threaded coupling 100 which connects the cam hub with a collar 101 that is fastened to the shaft. By turning the coupling the cam may be adjusted longitudinally on the shaft. (Fig. 4). The shaft extends longitudinally of the frame beneath the bed, and on one end has a beveled gear 10 which is engaged by a pinion 11 on the shaft 12 that bears the driving pulley 13. (Figs. 1, 2). The feed slide is drawn back, when the cam allows, by a weight 14 that is connected with the end of the slide by a cable 15. The plate 4 has a shoulder 16 which engages the end of a stop screw 17 for limiting the backward movement of the slide and thus, with the cam, determining the amount of wire fed. This stop screw is adjustably held by a yoke 18 that is mounted on the bed (Figs. 1, 2), and spans the end of the feed slide.

Mounted on the feed slide is a block 19, held in which is the tubular stem 20 of the chuck 21. In this block and surrounding the tubular chuck stem is the chuck closing tube 22. This tube is normally thrust forward by a spring 23 at its rear end, and when it is forward the inclined inner wall at its front end engages the tapering exterior wall of the chuck so as to close it and cause it to grip the wire (Fig. 4). Extending transversely of the block on the feed slide is an arbor 24 which has a rocker arm 25 that engages the chuck closing tube. Fastened on the back end of this arbor is a lever 26. On the short arm of this lever is a roll 27, and projecting from the long arm is a latch pin 28. Beneath the lever roll 27 is a bar 29. This bar at one end is jointed to a rocker arm 30. At the other end the bar is jointed to the upper end of a lever 31, that is pivotally supported on the top of the bed and at its lower end has a roll 32 which is held in engagement with the cam 33 by the spring 34 (Fig. 4). At the proper time this cam swings the lever against the pull of the spring and lifts the bar 29 with a parallel motion in such manner as to oscillate the lever 26 and cause the rocker arm 25 to draw back the chuck closing sleeve against its spring and allow the chuck to open (Figs. 1, 3, 4). The bar with its parallel motion is provided so that notwithstanding the position to which the chuck block is adjusted or the path of movement of the slide is varied, the chuck will always be opened at the proper time to release the wire, without altering the adjustment of the mechanism for drawing back the chuck closing tube.

Pivotally mounted on the chuck block is a lever 35. This lever has a latch hook 36 at its lower end that is adapted to engage with the latch pin 28 which projects from the lever 26. A spring 37 is arranged to pull this lever so that the latch hook will engage the latch pin and hold the chuck sleeve back while the chuck is open. A screw 38 turning in the stud 39 that is mounted so as to remain stationary with the bed, is adapted to engage the lower end of this lever for disengaging the latch hook from the latch when the slide is drawn way back and the chuck is to be closed. (Fig. 4). By means of this mechanism the chuck is held open when the slide is drawn back for the purpose of getting a fresh bite on the wire without any friction between the roll on the lever that causes the finger to draw back the chuck closing tube, and the bar that is lifted to accomplish this. This insures the free backward movement of the slide.

The chuck is closed on the wire when the slide moves up to feed the proper length of stock to form the staple. This length of stock is fed into an opening between a gripping jaw 40 that is fixed on the bed and a complementary jaw 41 that is movable up and down above the stationary jaw. (Fig. 4.) The slide 42, to which the movable jaw is attached, is held in a way in the front of a bracket 43 removably fastened on the top of the bed, a plate 44 being fastened to the face of the bracket over the way for holding the movable jaw slide in place. (Figs. 2, 3.) The movable jaw slide at the top is connected by links 45 with a lever 46 that is pivoted to the top of the bracket. This lever is drawn down so as to lift the slide and gripping jaw, by a spring 47, and it is lifted by a rod 48. (Figs. 2, 3.) The lower end of this rod 48 is engaged by the end of an angle lever 49 that is hung on the underside of the bed and is oscillated by a cam 50 on the cam shaft. (Figs. 2, 7.) This cam is timed to operate the connections so as to cause the upper jaw to move down and with the stationary jaw grip the wire while the chuck is opened and the slide is moving back for obtaining a hold on the stock for the next feed.

The stationary and the movable jaws each have two slots 51, one on one side and one on the opposite side, the slots on one side being in one plane, and those on the other side being in another plane. (Fig. 4.) Rotary milling cutters 52, are, at the proper time when the wire is gripped by the jaws, moved up into these slots for the purpose of milling the wire on opposite sides at different localities. These mills may be set obliquely or, as shown, may have inclined cutting edges so that when they are moved up they taper down sections of the stock held by the jaws, as illustrated in Figs. 8, 9, 10 and 11, for pointing the ends of the staples. The jaws are so shaped that they lock together as shown in Figs. 17 and 18, and they grip and pinch the wire at both edges and at the center, and back up the sections of the wire when it is milled so that the wire, although very small in diameter, will not be dragged out of place and be mis-cut or broken while it is being milled.

The mills are mounted on arbors 53 held by bearings in blocks 54. The mill arbors are provided with worm gears 55 and these are engaged by worms 56 on arbors 57 that are provided with driving pulleys 58. (Figs. 1, 2). By means of these mechanisms the mills are suitably rotated. The blocks which carry the mills are adjustable transversely on slides 59 that are movable back and forth on the top of the bed. Screws 60 are provided for adjusting the blocks on the slides and moving the mills sidewise according to the length of the staples to be formed. Springs 61 are arranged to draw the slides inward. The slides are moved outward by the engagement of the upper ends of the angle levers 62 with the ends of adjusting screws 63 that are carried by the mill slides. These angle levers on their inner ends have rolls 64 that are engaged by the cams 65 which are keyed on the cam shaft some distance apart. (Figs. 3, 4). These cams, through these levers, draw the mill slides out and withdraw the mills from the stock to permit feeding. When the cams allow, the springs 61 draw the mill slides in a distance depending on the adjustment of the screws 63, so that the mills will taper sections of the stock in different directions.

At the succeeding feed of wire to the gripping jaws, the length that has been milled is advanced over the bending disk 66 between the mandrel 67 and the former 68. (Fig. 8). The former 68 is attached to the lower end of a tubular shaft 69 that is mounted vertically in the bracket 70, and the mandrel 67, about which the wire is bent, is attached to the lower end of a solid shaft 71 that extends through the tubular former shaft. (Fig. 4). The bender 72 is on the upper face of the disk 66, and this disk has a stem 73 which is held by the bracket 70 and is coupled with the upper end of the shaft 74. This permits the bracket 70 to be removed with the bender, former and mandrel, so that different sizes of these parts may be readily substituted. On the lower end of this shaft 74 is a bevel gear 75 meshing with which is an interrupted bevel gear 76 on the main cam shaft. (Fig. 4). On the hub of the gear 75 is a drum 77 and connected with this drum by a chain 78 is a weight 79. (Figs. 2, 5, 6). The rotation of the cam shaft and gear 76 turns the gear 75 and disk 66 with the bender 72, for bending the wire about the mandrel, until the interrupted section of the gear 76 is reached, then the weight 79 pulls the gear 75 back and returns the bender to normal position. Projecting up from the chain drum is a lug 80 which is adapted to engage the lug 81 that projects down from the fixed collar 82, for stopping the bender at the right point when it is returned by the weight. (Figs. 5, 6).

An arm 83 projects from the upper end of the solid shaft that carries the mandrel, and a spring 84 draws this arm into engagement with the stop screw 85 (Figs. 1, 2, 13). This holds the mandrel in normal position but allows the mandrel at the proper time to be forced out of normal position. Beneath the arm 83 a similar arm 86 projects from the upper end of the tubular shaft that carries the former, and a spring 87 draws this arm into engagement with a stop screw located below the screw 85. This holds the former in normal position but allows it to yield when necessary. Both of these arms 83, 86, and the springs and stop screws are the same as shown in Fig. 13, one being directly above the other as shown in Fig. 12.

A spring plunger 88 held in a socket 89 in the bracket 43 presses upon the top of the solid shaft 71 and forces that shaft and the hollow shaft 69 down so as to hold the mandrel and the former in the plane of normal operation. (Figs. 2, 12). One end of a lever 90 extends beneath the arm 86 on the upper end of the tubular shaft that carries the former. The other end of this lever is connected with a rod 91 that is fastened to a yoke 92, provided with a roll 93 which is engaged by the cam 94 on the cam shaft, at the proper time to cause the lever to lift the mandrel and former so that the finished staple will be free to be ejected or blown off of the bending disk, on which it was shaped, into the discharge tube 95. (Figs. 1, 2).

The gears 75 and 76 cause the bender to swing around from the position shown in Fig. 8 to the position shown in Fig. 9 in which the tip 950 (Fig. 8) is sheared off at the smallest section of the forward milled portion by the edge of the mandrel in conjunction with the edge of the block 96 that is fastened to the bracket 70 adjacent to the edge of the bending disk 66. The continued movement of the bender folds the wire around the mandrel and shapes the folded leg 97 between the mandrel and bender as shown in Fig. 10. Further movement of the bender pushes the yielding mandrel and causes it in conjunction with the edge of the gripping jaws to shear off the staple from the following wire at the smallest section of the rear milled portion, and then to press the other leg 98 into the desired shape between the mandrel and the former, which yields under excess force to prevent damage to any of the parts due to faulty adjustment or foreign matter. When this is accomplished the bender turns back and the mandrel and former resume normal position and then the mandrel and former are lifted so as to free the staple and permit it to be ejected.

The invention claimed is:

1. In a staple forming machine the combination of mechanism for feeding the stock, jaws for gripping the fed stock, rotatory means for tapering the stock that is held by the jaws, and means for cutting off and bending the tapered stock into staple shape.

2. In a staple forming machine the combination of mechanism intermittently operated for feeding the stock, jaws intermittently opened and closed for permitting the feed and for gripping the fed stock, rotatory means for tapering the stock that is held by the jaws, and means for cutting off and bending the tapered stock into staple shape.

3. In a staple forming machine the combination of mechanism for intermittently feeding a continuous length of stock, jaws intermittently opened and closed for permitting the feed and for gripping the fed stock, means for tapering the stock that is held by the jaws, and means for cutting off the tapered section of the stock and bending the severed pieces into staple shape.

4. In a staple forming machine the combination of a mandrel, mechanism for feeding the stock past the mandrel, a rotatory bender, and mechanism for causing the bender to engage the free end of the fed stock and bend it about the mandrel into a plane substantially parallel with the other end of the fed stock.

5. In a staple forming machine the combination of a yielding mandrel, mechanism for feeding the stock past the yielding mandrel, a rotatory bender, and mechanism for causing the bender to engage the free end of the fed stock and bend it about the yielding mandrel into a plane substantially parallel with the held end of the stock and also to cause the mandrel to yield and cut off the held end of the stock.

6. In a staple forming machine the combination of mechanism for feeding the stock, a yielding mandrel past which the stock is fed, a former adjacent to the mandrel, and a rotatory bender for bending the free end of the stock about the mandrel into a plane substantially parallel with the held end of the fed stock and forcing the mandrel toward the former for cutting off and shaping the held end of the stock.

7. In a staple forming machine the combination of mechanism for feeding the stock, a yielding mandrel past which the stock is fed, a yielding former adjacent to the mandrel, and a rotatory bender for bending the free end of the stock about the mandrel into a plane substantially parallel with the held end of the fed stock and forcing the mandrel toward the former for cutting off and shaping the held end of the stock.

8. In a staple forming machine the combination of a yielding mandrel, a former adjacent to the mandrel, and a rotatory bender for bending the free end of the stock about the mandrel into a plane substantially parallel with the held end of the stock and forcing the mandrel toward the former for cutting off and shaping the held end of the stock.

9. In a staple forming machine the combination of a yielding mandrel, a yielding former adjacent to the mandrel, and a rotatory bender for bending the stock about the mandrel and forcing the mandrel toward the former.

10. In a staple forming machine the combination of a mandrel, a former adjacent to the mandrel, a rotatory bender, and mechanism for moving the bender toward the mandrel for shaping one side of the staple between the bender and the mandrel and moving the mandrel against the former for shaping the other side of the staple between the former and the mandrel.

11. In a staple forming machine the combination of a yielding mandrel, a cutting plate adjacent to the mandrel and coöperating therewith for severing the stock, a former adjacent to the mandrel, a bender, and means for moving the bender toward the mandrel for shaping one side of the staple and moving the mandrel toward the former for cutting off and shaping the other side of the staple.

12. In a staple forming machine the combination of means for tapering sections of the stock, a mandrel, a bender, a former, and mechanism for moving the parts and shaping one of the tapering sections of the stock between the mandrel and bender, and shaping the other tapering section of the stock between the mandrel and former.

13. In a staple forming machine the combination of a single rotatory bender, a yielding mandrel, a former adjacent to the mandrel, mechanism for moving the bender about the mandrel for shaping one side of a staple between them, and for moving the mandrel toward the former for shaping the other side of the staple between them, and mechanism for separating the parts and freeing the staple so that it may be ejected.

14. In a staple forming machine the combination of mechanism for feeding the stock, a yielding mandrel past which the stock is fed, a rotatory bender for bending the free end of the stock about the mandrel into a plane substantially parallel with the held end of the stock and for moving the mandrel and causing it to cut off the held end of the stock, and mechanism for lifting the mandrel after the stock has been cut off and freeing the stock bent around it.

15. In a staple forming machine the combination of a yielding mandrel, a former adjacent to the mandrel, a rotatory bender for bending the stock about the mandrel and forcing the mandrel toward the former, and mechanism for lifting the mandrel and the former for freeing the stock shaped thereby.

16. In a staple forming machine the combination of a yielding mandrel, a spring for holding the mandrel in normal position, a rotatory bender, and mechanism for rotating the bender about the mandrel.

17. In a staple forming machine the combination of a yielding mandrel, a spring for holding the mandrel in normal position, a yielding former, a spring for holding the former in normal position, a rotatory bender, and mechanism for rotating the bender about the mandrel and forcing the mandrel toward the former.

18. In a staple forming machine the combination of a yielding mandrel, a spring for holding the mandrel in normal position, a yielding former, a spring for holding the former in normal position, mechanism for lifting the mandrel and the former from operative plane, a rotatory bender, and mechanism for rotating the bender about the mandrel and forcing the mandrel toward the former.

19. In a stable forming machine the combination of a mandrel, a bender for bending the stock about the mandrel, an interrupted gear for rotating the bender, and means for returning the bender when it is released by the interrupted section of said gear.

20. In a staple forming machine the combination of a mandrel, a bender, a gear for rotating the bender in one direction, an interrupted gear meshing with the bender gear, and a weight for rotating the bender in the opposite direction.

21. In a staple forming machine the combination of a mandrel, an arm connected with said mandrel, a spring pulling said arm in one direction, a screw limiting the pull of said spring, a rotatory bender adjacent to the mandrel, and mechanism for rotating said bender into coöperation with said spring retained mandrel.

22. In a staple forming machine the combination of a yielding mandrel, a former, an arm connected with said former, a spring pulling said arm in one direction, a screw limiting the pull of said spring, a bender, and means for rotating said bender into coöperation with said mandrel and said mandrel into coöperation with said former.

23. In a staple forming machine the combination of a mandrel, an arm connected with said mandrel, a spring pulling said mandrel arm in one direction, a screw limiting the pull of said spring, a former, an arm connected with said former, a spring pulling said former arm in one direction, a screw limiting the pull of said spring, a bender, and means for rotating said bender into coöperation with said mandrel, and said mandrel into coöperation with said former.

24. In a staple forming machine the combination of a mandrel and a former, one being fastened to a tubular shaft and the other to a shaft extending through the tubular shaft, means for yieldingly retaining the mandrel and former in normal position, a bender, and mechanism for rotating the bender and causing it to coöperate with the mandrel and former for shaping the staple.

25. In a staple forming machine the combination of a yielding mandrel, a bender adjacent to the mandrel, and mechanism for causing the bender to bend the stock about the mandrel.

26. In a staple forming machine the combination of a mandrel, a rotatory and vertically movable shaft supporting said mandrel, a bender, a rotatory shaft supporting said bender, a former, a rotatory and vertically movable shaft supporting said former, and mechanism for moving said parts and causing them to coöperate to shape the staple.

27. In a staple forming machine the combination of a mandrel and a former, one being fastened to a tubular shaft and the other to a shaft extending through the tubular shaft, springs holding said mandrel and former in normal position, a spring plunger holding said mandrel and former in operative plane, means for lifting said mandrel and former out of operative plane, and a bender operating in conjunction with the mandrel and former to shape the staple.

28. In a staple forming machine the combination of jaws for gripping the stock, a movable mandrel adjacent to the jaws, a bender, and means for moving the bender and shaping the stock about the mandrel and moving the mandrel and causing the latter to shear off the stock.

29. In a staple forming machine the combination of a mandrel, a former, a bender, a cutting block adjacent to the path of the bender, and means for moving the bender past the said block, whereby stock held by the mandrel and former and bent by the bender has its tip cut off by the cutting block and is shaped about the mandrel.

30. In a staple forming machine the combination of jaws for gripping the stock, a movable mandrel adjacent to the jaws, a former, a bender, a cutting block adjacent to the path of the bender, and means for moving the bender, whereby as the stock is bent by the bender its tip is cut off by said block, it is folded about the mandrel, and the mandrel severs the staple at the edges of the jaws.

31. In a staple forming machine the combination of a pair of slotted gripping jaws for holding stock, cutters with their edges movable in the slots of said jaws for cutting the stock, a mandrel, a bender, and mechanism for moving the bender about the mandrel and shaping the cut stock.

32. In a staple forming machine the combination of a pair of slotted gripping jaws for holding the stock, cutters with their edges movable in the slots of said jaws for tapering the stock, and means for bending the tapered stock.

33. In a staple forming machine the combination of a fixed jaw with a stock groove in its face and two slots opening through opposite sides into the stock groove, a movable jaw with a stock groove in its face and two slots opening through opposite sides into the stock groove, a rotary cutter on each side of the jaws with its edges extending into the slots of the fixed and movable jaws for the purpose of milling opposite sides of the stock held in the said stock grooves, and means for bending the milled stock.

34. In a staple forming machine the combination of a mandrel attached to a tubular shaft, a former attached to a solid shaft that extends through said tubular shaft, means for retaining the mandrel and the former in normal position, and a bender coöperating with said mandrel and former for shaping the staple.

35. In a staple forming machine the combination of a stationary jaw with slots on opposite sides in different planes, a movable jaw with slots on opposite sides in different planes, said jaws coöperating for holding the stock so it can be milled, milling cutters turning in said slots, and means for bending the stock after it has been milled.

36. A staple bending mechanism comprising a yielding mandrel, a yielding former adjacent to the mandrel, means for lifting the mandrel and the former, and a bender coöperating with the mandrel and former for shaping the staple.

37. A staple bending mechanism comprising a mandrel, a lever and cam for lifting the mandrel, a spring plunger for holding down the mandrel, a bender, and means for rotating the bender about the mandrel.

38. In a staple forming machine the combination of a jaw with slots on opposite sides in different planes, a jaw with slots on opposite sides in different planes, said slots on the same side complementing each other when the jaws are closed, means entering said slots for pointing the staple stock held by the jaws, and means for shaping the pointed stock.

39. In a staple forming machine the combination of mechanism for feeding a continuous length of stock, mechanism for gripping said stock, rotatory mills with the peripheries of the mills oblique with relation to the axis of the stock for milling the stock on an angle, and mechanism for bending the milled stock.

40. In a staple forming machine the combination of stock holding dies, mechanism for feeding stock to the dies, mechanism for taper milling two sections of the stock held by the dies, mechanism for cutting off the stock at the smallest ends of both of the milled sections, and mechanism for shaping the cut stock.

41. In a staple forming machine the combination of mechanism for feeding stock, mechanism for taper milling two sections of the stock, dies shaped to back up and hold the intermediate sections that are milled and sections of the stock each side of the milled sections, mechanism for cutting off the stock at the smallest ends of both of the milled sections, and mechanism for shaping the cut stock.

In testimony whereof, we have signed our names to this specification in the presence of two subscribing witnesses this 11th day of May, 1912.

JOSEPH MERRITT.
W. A. SAWYER.

Witnesses:
CAROLINE M. BRECKLE,
CHARLOTTE S. HULL.

Copies of this patent may be obtained for five cents each, by addressing the "Commissioner of Patents, Washington, D. C."